(No Model.) 6 Sheets—Sheet 1.
E. W. ROSS.
MACHINE FOR CUTTING FIBER.

No. 287,392. Patented Oct. 23, 1883.

Witnesses:
Samuel E. Lincoln
Frank R. Rathbun

Inventor:
Elmore W. Ross (No Model.) 6 Sheets—Sheet 2.

E. W. ROSS.
MACHINE FOR CUTTING FIBER.

No. 287,392. Patented Oct. 23, 1883.

Witnesses: Inventor:

(No Model.) 6 Sheets—Sheet 3.

E. W. ROSS.
MACHINE FOR CUTTING FIBER.

No. 287,392. Patented Oct. 23, 1883.

Witnesses: Inventor:

(No Model.) 6 Sheets—Sheet 4.

E. W. ROSS.
MACHINE FOR CUTTING FIBER.

No. 287,392. Patented Oct. 23, 1883.

Witnesses: Inventor:

(No Model.)　　　　　　E. W. ROSS.　　　6 Sheets—Sheet 5.
MACHINE FOR CUTTING FIBER.
No. 287,392.　　　　　　　　Patented Oct. 23, 1883.

UNITED STATES PATENT OFFICE.

ELMORE W. ROSS, OF FULTON, NEW YORK.

MACHINE FOR CUTTING FIBER.

SPECIFICATION forming part of Letters Patent No. 287,392, dated October 23, 1883.

Application filed June 28, 1881. (No model.)

*To all whom it may concern:*

Be it known that I, ELMORE W. ROSS, of Fulton, in the county of Oswego, State of New York, have invented certain new and useful Improvements in Agricultural and Fiber-Cutting Machines, of which the following is a specification.

My invention relates to improvements in agricultural and fiber-cutting machines in which the cutter-knives may cut either from above or below; a self-adjusting feed-roll and an independently-yielding compressor, acting in conjunction therewith, both arranged to accommodate themselves to the varying thickness of the material operated upon; to a yielding feed-roll actuated by round-faced gear and a sliding or extensible tumbling shaft; to the employment of a carrier in combination with a supplemental feed-box or annexed table; to the construction of knives in two or more sections to perform the office of a single long knife, the sections being arranged either to abut together in one continuous shear line or to stand in a broken shear line; and to the employment of three or more knife heads or hubs upon the same shaft, so as to permit the use of two or more sections of a single knife, either in broken or unbroken shear line, the same also serving as a support to long knives to prevent the springing away of their centers from the cutting-edge of the stationary mouth-piece.

In the accompanying drawings, Figure 1 is a right-hand side elevation of a cutting-machine, the position of right and left being taken from the cutter or driving-wheel end of the machine. Fig. 2 is a left-hand elevation of the same. Fig. 3 is a plan view with the hood removed. Fig. 3ª is a broken section of the end of the supplemental table which abuts against the feed-box, showing the trap for the escape of foreign substances. Fig. 4 is a sectional view of Fig. 3, taken upon the dotted line $xx$ thereof. Fig. 5 is a front view of the two feed-rollers, showing the gears attached, respectively, thereto in section. Fig. 6 is a vertical section through the fluted feed-roller. Fig. 7 is a side view of the gearing of the feed-rollers and the upper and compound yokes thereof. Fig. 8 is a plan view of the round-faced gear and its compound yoke, having trunnions at either end. Fig. 9 is a view, partly in section, of the cutter-knives and main shaft, showing the relative position of the same to the mouth-piece, adjustable compressor, and feed-rolls, and the actuating mechanism of the lower feed-roller and adjustable compressor in an upcutting machine. Fig. 9ª shows the compressor provided with friction-rollers. Fig. 10 is a view of the feed-rollers similar to Fig. 5, showing a modification in the extensible tumbling coupling between the fluted feed-rollers and the round-faced gear. Fig. 11 is a view of the pin end of the round-faced gear-shaft. Fig. 12 is a view of the slotted hub end of the fluted feed-roller shaft.

Similar letters refer to similar parts throughout the several views.

A A is the supporting frame-work of the cutting-machine.

B B are the side boards of the feeding-box.

B² is the bed or platform of the feeding-box.

C is a supplemental feed-table provided with a feeding carrier or apron.

D is a broken section of an adjustable carrier attachment for removing the cut material, and driven in any desired manner from the main shaft.

E is a driving-pulley keyed to the knife or main shaft, being connected by belting to the driving-power.

F is a loose pulley upon the knife or main shaft.

G G are the vertical cheek-studs of the head-rigging.

H is the top board of the head-rigging, and I the bottom board of the same.

J is a hood, constructed so as to be easily removed, and completely covering the knife-cutters, thus preventing the cut stock from flying, and also preventing accidents.

K is a brace to the frame-work A A.

L is one of two spring-bars placed in position on either side of the machine, their larger or outer ends resting against and below a cross-piece of the frame-work, and having fulcrum bolts or rods $d$, spring-bolts C' at their smaller or inner ends, and spring-box carrying rods or bolts $n$.

M is an ordinary balance-wheel fastened to the outer end of the knife or main shaft, on the left-hand side of the machine.

N is a spur driving-gear fastened to the left-hand end of the upper feed-roller shaft.

O is the upper feed-roller gear.

P is a yoke for gear O, fastened by bolts $j\ j$ to the cheek-studs of the head-rigging G G, and serving to support the outer end of the upper feed-roller shaft.

Q is a round-faced gear mounted in a swiveling yoke, R, and connected by a sliding or extensible tumbling shaft with the fluted feed-roller. By the use of this round-faced gear, adapted by its swiveling yoke to vibrate laterally, the pitch-line of the rounded teeth is always preserved in proper and mechanical relation to the straight-faced gear by which it is driven, or which it may drive at all times, whereas with two straight-faced gears there would be but one point of vibration in which the teeth would be in proper pitch-line, while at the extreme vibrations of the said gear the teeth would "bottom" and ride.

R is a compound yoke, made in two parts fastened together by bolts $l\ l$. At either end of this compound yoke are trunnions $k\ k$, having bearings in the cheek-studs of the head-rigging G G. This yoke serves to carry the round-faced gear Q, and by being hung on the trunnions, as described, it accommodates itself to any vertical or inclined plane the round-faced gear may assume when the machine is in operation. I also construct a yoke of similar form in a single piece, in which the round-faced gear is held in position and place by the shaft passing through the sides of the yoke and hub of the gear, as seen in Fig. 10 at $R^2$, the difference in the two yokes being that when a compound yoke is used the slack of the universal-joint shaft is either given or taken up through the hub of the round-faced gear, while in a simple yoke the slack or vibration of the shaft is given or taken up either in a pin-coupling or a coupling-shaft in two parts, as presently described, the end of said shaft being fastened in the hub of the round-faced gear and having bearings in the yoke.

S S S S are head-rods passing through and from the upper head-board, H, to and through the bottom head-board, I, thus serving to secure and strengthen this portion of the mechanism.

T is the knife-shaft or main shaft, running in the several boxes, as represented in Fig. 4.

U is a small feed-pinion upon the main shaft, gearing into the feed-gear N.

V V V V are the cutting-knives, cutting upon a shear to the cutting-edge of the stationary mouth-piece A', and in their cross-section corresponding to the circle of their rotation. These knives are fastened by means of a rivet-headed bolt, J', and nut to hangers W.

X X X X are the knife-heads, which project from a common hub fastened to the main shaft T. To these heads the hangers W are fastened by means of bolts K'. In a large machine, where the length of the knives renders it desirable, one or more additional heads are interposed at proper intervals between the end ones, for preventing spring of the knife, and in such larger machines I may form the knife in two or more short sections, with their ends abutting against each other and forming a continuous cutting-edge. The knife-heads may be so adjusted as to cause the sections to break joints, so to speak, at their adjoining ends, this construction and arrangement reducing the cost of replacement should any of the sections become broken.

Y is a smooth-faced feed-roller, represented as placed above the fluted feed-roller. It is fastened to the shaft $e$, which is actuated by the gear-wheel N.

Z is the lower fluted feed-roller, having flutes $p$ and narrow fillets or rolling-surfaces I' I' at its ends for the upper feed-roll to ride upon, thus preventing the pounding or jarring of the same upon the flutes $p$, and consequent jar to the machine, possible breakage and loosening of nuts, while at the same time giving an intermittent feed to the material operated upon.

A' is a stationary mouth-piece, which may be placed in position in front of the smooth-faced feed-roller, arranged either above or below the material being operated upon—above in upcutting machines and below in downcutting machines—and is provided with a cutter-edge of chilled iron, or a steel plate, $a'$, bolted thereto, as represented.

B' is an adjustable compressor or mouth-piece, which may be placed either above or below the stationary mouth-piece, being in either case in vertical apposition thereto. This compressor or mouth-piece is provided with perforated arms, through which it is hinged to the shaft of the yielding feed-roller, and has the bolts C' pivoted to it at $b'$, said bolts being surrounded by spiral springs so arranged that when pressure is brought to bear on said mouth-piece after the stock has passed the feed-rollers it may yield to accommodate said pressure independently of the yielding feed-roller, vibrating around the latter as a center. The connection of the mouth-piece with the shaft of the feed-roller adapts said mouth-piece also to yield with said roller, the bolts C' being acted upon by the spring-bars L, for drawing the mouth-piece down when the feed-roller yields.

D' is a spring-box bearing against the under side of the shaft $f$ of the fluted feed-roller Z. This spring-box is actuated by a bolt or rod, $n$, passing therefrom to the spring-bar L, said rod being provided with an adjusting-nut, $o$.

E' is the spout of the machine, from which the cut material falls to the carrier.

F' is an ordinary universal joint, one portion of which is attached to one end of the fluted feed-roller shaft $f$ and another portion attached to the shaft $u$, the outer end, $m$, of which passes through the hub of the round-faced gear. The hole of the hub of the round-faced gear may be of any shape, so that a positive driving motion is secured, and the end $m$ of the shaft $u$ is made to conform in shape thereto. In the drawings the hole in the hub and the end of the shaft are shown of a six-sided form. The end of the shaft sliding freely in the hub of the round-faced gear, it will be seen that all give and take of slack in the connecting parts between the round-faced gear and the feed-roller Z, caused by the forcing apart of the feed-rollers by the passing stock, is made in the hub of the round-faced gear.

G', Fig. 10, is an extensible pin-coupling, which may be used as a substitute for the construction last above described, and which consists of a hollow cylindrical hub, G', attached to the shaft $f$ of the lower feed-roll, Z, and having one or more longitudinal slots, $s$. Upon the end of the round-faced gear-shaft $u$ is a small hub having pins $t$, to correspond in number to the number of the slots in the above-mentioned hub and working therein. This form of sliding coupling has been found in practice to work with great freedom, obviating all binding or cramping of the parts. The outer end of the round-faced gear-shaft $u$ is fastened to the gear, and in Fig. 10 is shown holding the gear in position by passing through the sides of a plain yoke constructed in one piece and working upon trunnions, as set forth in the construction of a compound yoke. All the give and take consequent upon the separation of the feed-rollers, it will thus be seen, takes place directly in the pin-coupling parts, while a positive rotation of the shaft is secured by the bearing of the pins $t$ upon the side walls of the slots in the hub G'. If desired, I construct a double pin-coupling having two sets of pins and two hubs with slots, as described, for the purpose of obtaining two angles between the round-faced gear and fluted feed-roller.

H' is still another form of coupling-shaft which it is found desirable to use in some of my machines, and is for the same object—that is, the giving and taking of the slack when the feed-rolls are separated. This form of coupling-shaft consists of two parts, the male part $x$ and the female part $w$. The female part $w$ is secured to the round-faced gear Q, and the male portion $x$ is connected by means of a universal joint to the shaft $f$ of the lower feed-roller, Z. The female part $w$ has a hollow socket or hole of any desired shape that will secure a positive driving motion, the male part $x$ corresponding to and fitting in the same. The give and take of slack, it will thus be seen, takes place in the junction of the two parts $w$ and $x$. $y$ is a collar on the female part $w$, bearing against the hub of the round-faced gear. The arrangement of the parts may be reversed, if desired.

I' I' are rings formed upon or secured to the ends of the fluted feed-roller Z, upon which the smooth upper feed-roller Y may ride without jar or damage, as already described, said rings forming smooth rolling surfaces.

J' J' are bolts securing the knives to hangers W.

K' K' are bolts securing the hangers W to knife-heads X.

M' is a safety balance-wheel having a hollow hub, N', arms L', and lugs U'.

O' O' O' are friction-gibs interposed between the shell of the hub N' and the sleeve S', which latter may be omitted and the friction-gibs brought to bear upon the shaft itself, if desired.

P' P' are lugs cast upon the inner side of the hub N', serving to hold the friction-gibs O' O' O' in position.

Q' Q' Q' are bosses cast upon the outside of the hollow hub N', through which pass the set-screws R', their inner ends bearing upon the friction-gibs O' O' O'.

S' is a sleeve fastened to the main shaft T, upon the outside of which the friction-gibs O' O' O' are brought to bear. This sleeve S' has a flange, W', which serves to hold both the safety balance-wheel and the driving wheel or pulley in place upon the shaft T when the two are bolted together.

T' is the driving-pulley, having arms Y', through which are holes V for the admission of the bolts V', in securing the same to the balance-wheel. The hub Z' of the driving-pulley is placed to one side thereof, and has a recess, X', which fits over the flange W' of the sleeve S', in conjunction with which the driving-pulley and the safety balance-wheel are secured in a fixed position upon the shaft T.

U' U' are lugs cast upon the arms of the safety balance-wheel, through which the bolts V' pass, securing the driving-pulley to the balance-wheel.

Figures 16, 17, 18:
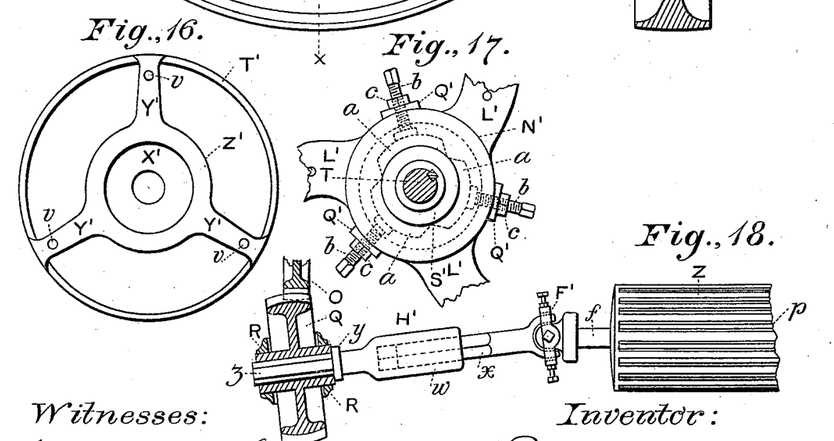
Fig. 16 is a view of the dividing-pulley, taken from the side which abuts against the safety balance-wheel.
Fig. 17 represents a central broken section of a safety balance-wheel in which the friction-gibs are of different construction from those shown in Fig. 13.
Fig. 18 represents another form of extensible tumbling shaft for connecting the yielding feed-roll with its driving-gear.
Figure 19:
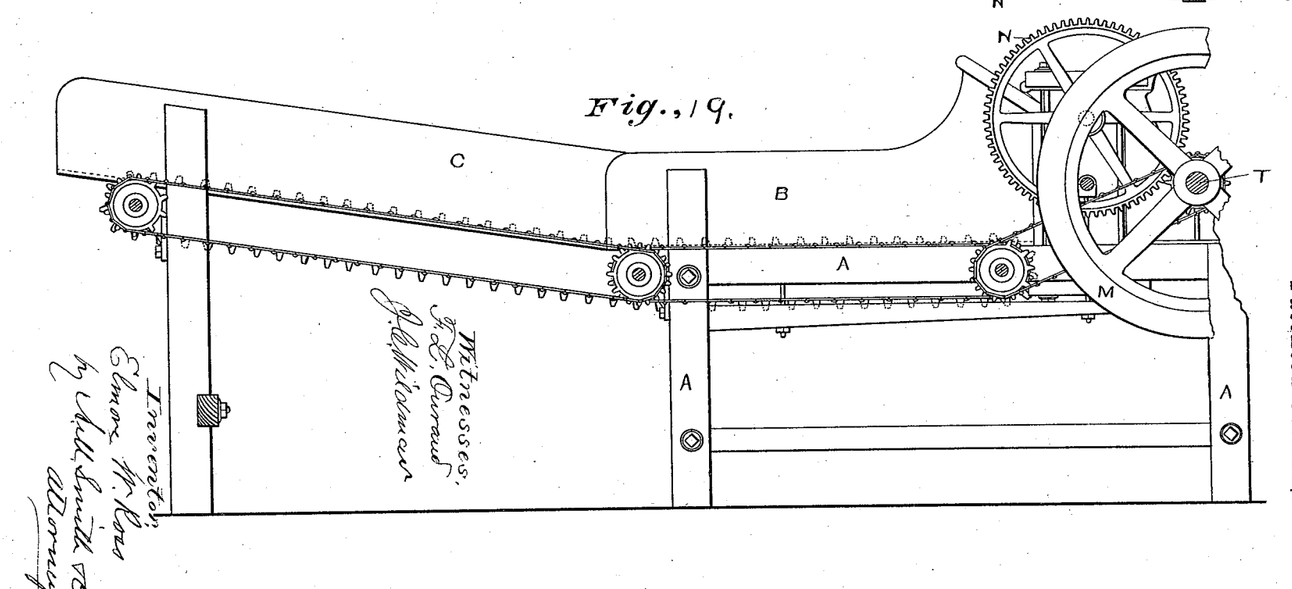
Fig. 19 is a side elevation, showing the arrangement of the main and supplemental feed-boxes and mechanism for actuating the feeding devices thereof.
Figure 20:
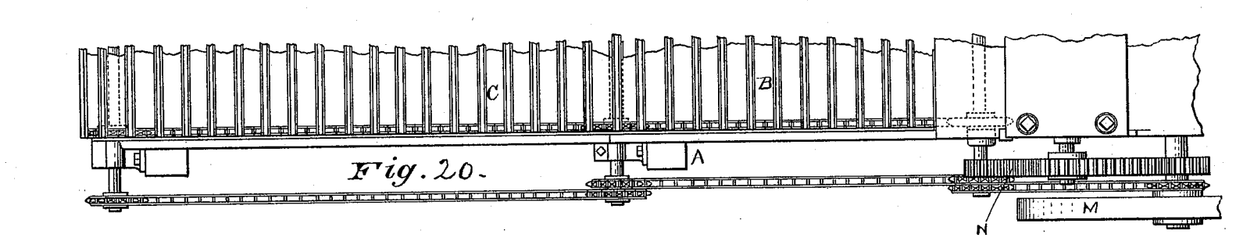
Fig. 20 is a broken plan view, showing an arrangement of carriers in connection with the two feed-boxes.
Figure 21:
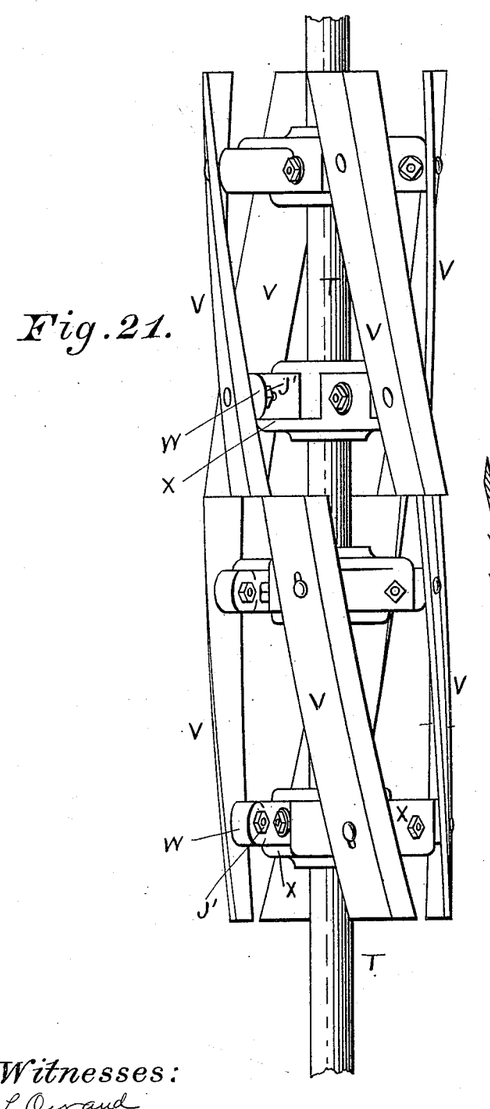
Fig. 21 is a front elevation of the knife-cylinder, showing the knives made in short sections, with the independent cutter hubs or heads for supporting them.
Figure 22:
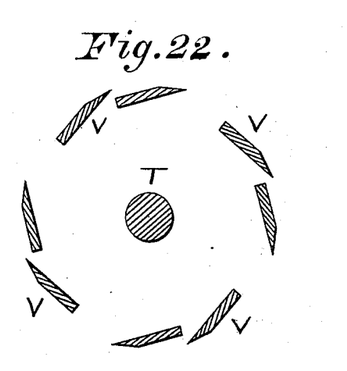
Fig. 22 is a section through Fig. 21, showing the relation of the short sections of the knives when arranged in broken shear lines.

Fig. 17 shows a variation in the mode of constructing the friction-gibs. $a\ a\ a$ are the friction-gibs, having bosses against which a flat-ended set-screw, $b$, is set, held in place by a jam-nut, c, which may be dispensed with, if desired. In this variation the lugs P' are omitted.

g, Fig. 2, is a slot in the left-hand side plate, i, a corresponding slot being formed in the right-hand side plate, h, said slots being made to accommodate the vertical movements of the shaft f of the feed-roll Z, and also the vertical movements of the spring-boxes D'.

m is the end of the shaft of the universal joint F', which passes through the hub of and is driven by the round-faced feed-roller gear, being made of any desired form that will serve to give a positive driving motion and at the same time allow it to slide lengthwise in the hole in the hub of the gear conforming to the same.

q is the gear end of the pin-coupling shaft, and it may be made of any desired form that will secure a positive driving motion. It passes through the hub of the round-faced gear, the hole of which is made to conform in shape thereto, and has bearings on either side thereof in the sides of the simple yoke $R^2$, thus serving to hold the round-faced gear in proper working position.

z is the end of the female portion of the coupling-shaft in two parts, (see Fig. 18,) being secured to the hub of the round-faced gear Q, and formed in any shape that will secure a positive driving motion.

a' (see Fig. $3^a$) is an opening or trap made in the end of the supplemental feed-table nearest to the main feed-box, which serves to allow of the passage of any foreign substance or dirt contained in the stock being fed to the machine, thus preventing said foreign matter or dirt from passing with the stock to the cutters.

b' is an incline extending entirely across the bed of the supplemental feed box or table, over which the foreign matter and dirt that may escape through the hole or trap a' pass.

c' is the bed of the annexed table.

The means for feeding the material to be operated upon may consist of a single carrier composed of endless side chains and transverse slats connecting them, as shown, or separate carriers may be used for each feed-box, that of box C' feeding to box B. Any suitable form of carriers and actuating mechanism may be used.

Having thus described fully and in detail the several parts of my improvements, their construction and relation to each other, I will now describe their operation.

Figures 9A, 12:
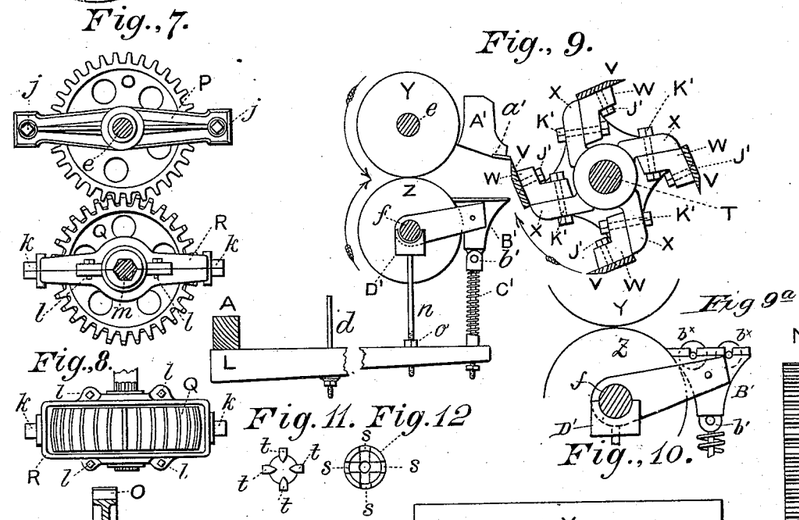
Figures 13, 15:
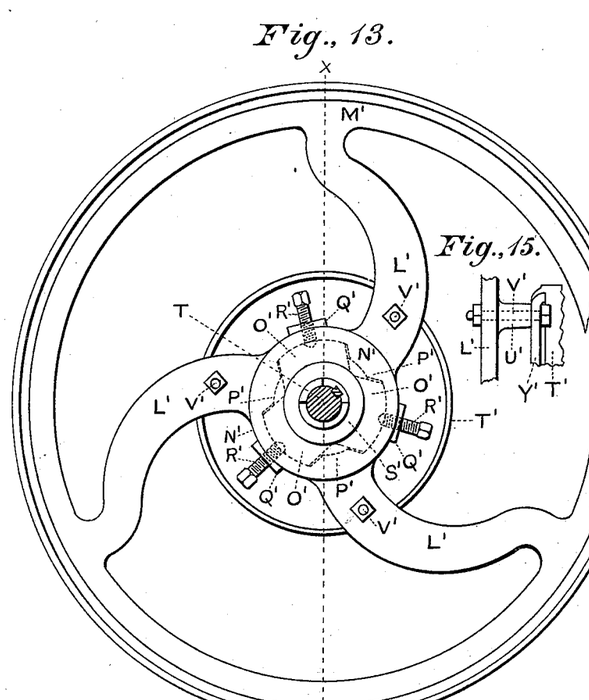
Fig. 13 is a side elevation of a safety balance-wheel with one form of friction-gibs.
Fig. 15 is a broken section of one of the arms of the safety balance-wheel, taken at the point of fastening the pulley T thereto.
Figure 14:
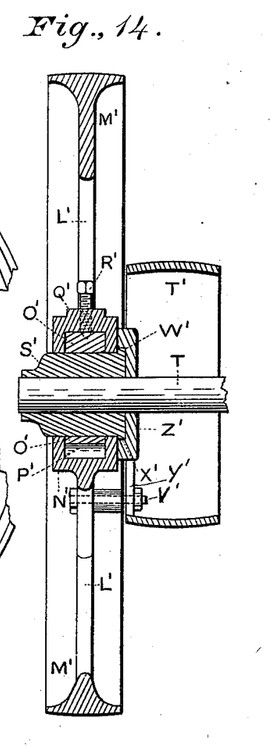
Fig. 14 is a vertical section of Fig. 13 through the dotted lines.

The stock or material to be cut is thrown, without regard to any regular distribution, upon the annexed table, from which it passes to the feeding-box over the trap a', through which any heavy or foreign matter or dirt contained in the material being served falls, passing over the incline b' to the ground. Where feed-aprons are used upon the supplemental and main feeding-boxes, the services of an operator for feeding the stock or material from the supplemental table to the feeding-box are of course dispensed with. The stock or material passes immediately from the main feeding-box to the feed-rolls, one of which is actuated by the feed-gear driven by the pinion attached to the main driving-shaft, and the other by gearing connecting it with the shaft of the first-named feed-roll As the stock passes to the feed-rolls they are forced away from each other in proportion to the varying thickness of the material fed, which brings into action the spring-bars attached near either end of one of the feed-rolls through the connection of the spring-boxes and their rods attached to the spring-bars, as already shown. From the feed-rolls the material passes through and between the fixed mouth-piece and the yielding compressor, and as it swells or expands from the pressure applied to it by the feed-rolls the yielding compressor is forced to give way and conform to all unevenness or lumpiness of material by the action of the spring-bolts attached thereto at either end and to the outer end of the spring-levers. This yielding compressor I use upon both upcutting and downcutting machines. In an upcutting machine it is placed below a stationary mouth-piece, and in downcutting machines it is placed above said mouth-piece. This compressor may consist simply of a jaw adapted to yield, as described, or it may be provided with one or more fluted or smooth friction-rollers $b^\times$, (see Fig. $9^a$,) the purpose being to compress and guide the material in the interval between the feeding-rollers and the knives, so as to prevent any spreading or curling of the material being cut, and the slipping or dropping down of pieces of stock. It also assists in producing an evenness of cut by guiding or carrying the material directly to the cutting-plate or cutting-edge of the stationary mouth-piece. The cutter-knives at this point cut up the material as it passes the mouth-piece by bringing their cutting-edges to bear with a shearing action against the chilled edge or cutter-plate of the stationary mouth-piece, and the cut material—such as rags, jute, hemp, straw, hay, sorghum-cane, sugar-cane, cornstalks, or ensilage stock—falls into the spout placed below the cutter-knives, and is conveyed thence by the carrier attachment to any desired point. The hood prevents the flying of the cut material, as well as accidents from broken knives or machinery. Should any foreign substance—such as stones, pieces of wood, or other matter—come in contact with the knives, causing them to stop or become retarded in motion, the slipping of the gibs or of the flat-ended set-screws from the bosses of the gibs, as described, releases the balance and band wheels from the cutter-shaft, and leaves them free to expend their momentum without damage to the several parts of the machine. The obstructions being removed, the screws or gibs are readjusted and the machine is again ready for operation.

Having thus described the construction and operation of my improvements, what I claim, and desire to secure by Letters Patent, is—

1. The combination, in a cutting-machine, of the two feed-rolls, one of which is adapted to yield in its bearings, gears for actuating said feed-rolls, one of said gears having its teeth and the pitch-lines thereof curved from side to side, a swiveling yoke in which one of said gears is mounted for permitting its lateral vibration, and a tumbling extensible shaft connecting said vibrating gear with the yielding feed-roll, substantially as described.

2. The combination, with the fixed cutter and yielding feed-roll, of a yielding compressor for holding the material operated upon against the fixed cutter, said compressor being hinged to and adapted to yield simultaneously with the shaft of said yielding feed-roll, and also independently of said roll, substantially as and for the purpose described.

3. The combination, in a cutting-machine having a fixed mouth-piece and cutter, of a yielding feed-roller and an independently-yielding mouth-piece or compressor hinged to and vibrating around the shaft of said roller for holding the material operated upon against the fixed mouth-piece and cutter, said yielding mouth-piece being provided with one or more friction-rollers for facilitating the movements of the material operated upon to the cutters.

4. The spirally-formed cutters, made in sections, arranged longitudinally and spirally on the cutting-cylinder, and connected each with two or more independent knife-heads having each one or more arms, to which said cutters are attached, whereby the line of cut is adapted to be broken, substantially as and for the purpose described.

5. The cutter-shaft provided with more than two independent radially-armed cutter-heads, in combination with spirally-arranged cutters secured each to two or more of said heads, whereby the line of cut is adapted to be broken, substantially as and for the purpose described.

6. The combination, with the main feed-box of a cutting-machine, of a second or supplemental feed-box provided with an opening for the escape of foreign matter, and mechanism for automatically feeding the material operated upon from said supplemental feed-box to the main feed-box and feed-rolls, substantially as described.

ELMORE W. ROSS.

Witnesses:
SAMUEL E. LINCOLN,
FRANK R. RATHBUN.